US012792511B2

(12) United States Patent
Roberts

(10) Patent No.: US 12,792,511 B2
(45) Date of Patent: Nov. 10, 2026

(54) SYSTEMS FOR SOFTWARE OPTIMIZATION OF DATA LAYOUT

(71) Applicant: Micron Technology, Inc., Boise, ID (US)

(72) Inventor: David Andrew Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/219,837

(22) Filed: May 27, 2025

(65) Prior Publication Data

US 2025/0383988 A1 Dec. 18, 2025

Related U.S. Application Data

(60) Provisional application No. 63/659,454, filed on Jun. 13, 2024.

(51) Int. Cl.
*G06F 12/00* (2006.01)
*G06F 12/06* (2006.01)

(52) U.S. Cl.
CPC .. *G06F 12/0646* (2013.01); *G06F 2212/1024* (2013.01)

(58) Field of Classification Search
None
See application file for complete search history.

(56) References Cited

U.S. PATENT DOCUMENTS

2021/0081326 A1* 3/2021 Curewitz ............ G06F 12/0284
2023/0214291 A1* 7/2023 Muthiah ............. G06F 11/0757 714/764

* cited by examiner

*Primary Examiner* — Daniel D Tsui
(74) *Attorney, Agent, or Firm* — Holland & Hart LLP

(57) ABSTRACT

Methods, systems, and devices for systems for software optimization of data layout are described. A memory manager may indicate an allocation of a memory space and performance records that indicate latency information for ranges of addresses within a memory space of a memory system. For example, the memory manager may allocate a physical region of memory that includes memory boundaries. Accessing memory within the different memory boundaries may correspond to varying latency costs. Thus, the performance records may indicate to the host system a mapping between the ranges of addresses within the memory space and the corresponding latency cost associated with accessing an address within the range. In some examples, a host system may sort data for storage within the memory system based on the performance records associated with the allocated memory space.

30 Claims, 7 Drawing Sheets

SYSTEMS FOR SOFTWARE OPTIMIZATION OF DATA LAYOUT

CROSS REFERENCE

The present Application for Patent claims priority to U.S. Patent Application No. 63/659,454 by Roberts, entitled "SYSTEMS FOR SOFTWARE OPTIMIZATION OF DATA LAYOUT," filed Jun. 13, 2024, which is assigned to the assignee hereof, and which is expressly incorporated by reference in its entirety herein.

TECHNICAL FIELD

The following relates to one or more systems for memory, including systems for software optimization of data layout.

BACKGROUND

Memory devices are used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored by the memory cell. To store information, a memory device may write (e.g., program, set, assign) states to the memory cells. To access stored information, a memory device may read (e.g., sense, detect, retrieve, determine) states from the memory cells.

DETAILED DESCRIPTION

Figure 1:
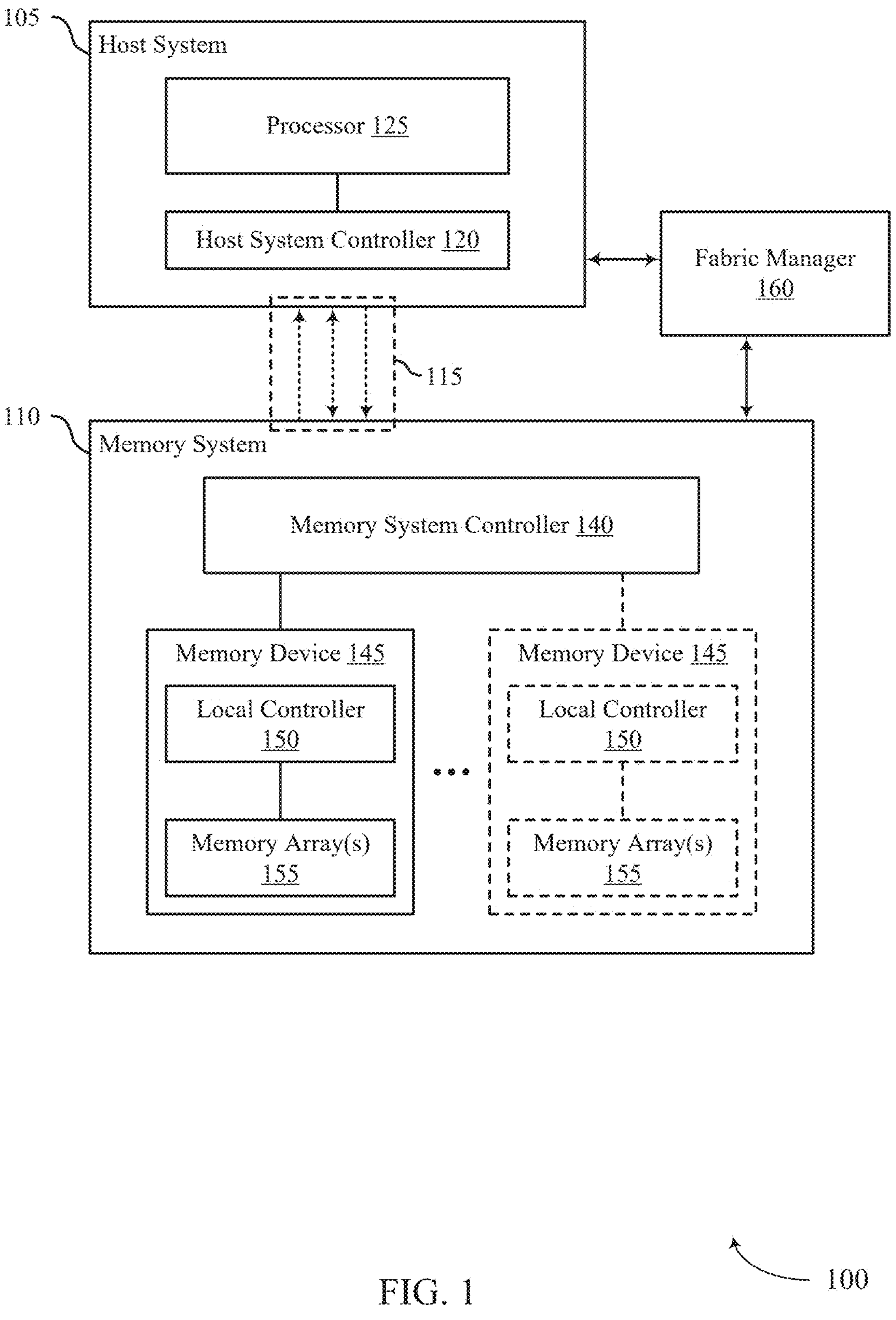
FIG. 1 shows an example of a system that supports systems for software optimization of data layout in accordance with examples as disclosed herein.

In some memory systems, an allocation of memory in the memory system may be based on interleaving the allocation across multiple memory modules. For example, memory interleaving may enable a host system to efficiently spread memory access across multiple interleaved memory modules (e.g., dual in-line memory modules (DIMMs), Compute Express Link (CXL) modules of a disaggregated memory pool) of the memory system. The host system may request an allocation of a memory space within the memory system, and the allocated memory space may be interleaved across various physical regions of several memory modules. It may be beneficial for the host system to obtain information about a physical organization (e.g., layout, data structures) of the allocated memory space, which may enable the host system to perform efficient memory access. However, the organization of memory (e.g., interleaving) within the memory system may be hidden from the host system. For example, an indication of memory allocation (e.g., from a memory manager) to the host system may indicate a pointer to a logical address associated with the allocated memory space, but the indication may lack any information about the underlying physical data structures of the allocated memory space.

In accordance with examples described herein, a memory manager may indicate an allocation of a memory space and performance records that indicate performance information (e.g., latency) for subsets of addresses (e.g., address boundaries) within the memory space. For example, the memory manager may allocate a physical region of memory that includes memory regions (e.g., rows, banks, ranks, planes), which may define one or more memory boundaries (e.g., between regions of the same type or different types). Accessing memory within the different memory boundaries (e.g., opening a new row) may correspond to varying latency costs. Thus, the performance records may indicate to the host system a mapping between the subsets of addresses (e.g., bit positions or bit indices) within addresses of the memory space and the corresponding latency cost associated with accessing an address within the subset. In some examples, the host system may sort (e.g., organize, rearrange) data for storage within the memory system based on the performance records associated with the allocated memory space. For example, the host system may perform one or more vector-based search algorithms (e.g., generate a graph) to determine logically similar data (e.g., nearest neighbors) within a data set. The host system may store logically similar data in adjacent memory within the memory space, which may support more efficient memory access of similar data that is frequently accessed together. By indicating the performance records associated with allocated memory and restoring data within the memory system based on the performance records, the memory manager may support lower latency, higher bandwidth, increased efficiency of memory utilization, or increased cache hit rates.

In addition to applicability in memory systems as described herein, techniques for software optimization of data layouts may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by improving memory access speeds, which may decrease processing or latency times, improve response times, or otherwise improve user experience, among other benefits.

Features of the disclosure are illustrated and described in the context of systems. Features of the disclosure are further illustrated and described in the context of architectures, sorting schemes, block diagrams, and flowcharts.

FIG. 1 illustrates an example of a system 100 that supports systems for software optimization of data layout in accordance with examples as disclosed herein. The system 100 may include portions of an electronic device, such as a computing device, a mobile computing device, a wireless communications device, a graphics processing device, a vehicle, a smartphone, a wearable device, an internet-connected device, a vehicle controller, a system on a chip (SoC), or other stationary or portable electronic system, among other examples. The system 100 includes a host system 105, a memory system 110, and one or more channels 115 coupling the host system 105 with the memory system 110 (e.g., to support a communicative coupling). The system 100 may include any quantity of one or more memory systems 110 coupled with the host system 105.

The host system 105 may include one or more components (e.g., circuitry, processing circuitry, one or more processing components) that use memory to execute processes, any one or more of which may be referred to as or be included in a processor 125. The processor 125 may include at least one of one or more processing elements that may be co-located or distributed, including a general-purpose processor, a digital signal processor (DSP), an application-specific integrated circuit (ASIC), a field-programmable gate array (FPGA) or other programmable logic device, a controller, discrete gate or transistor logic, one or more discrete hardware components, or a combination thereof. The processor 125 may be an example of a central processing unit (CPU), a graphics processing unit (GPU), a general-purpose GPU (GPGPU), or an SoC or a component thereof, among other examples.

The host system 105 may also include at least one of one or more components (e.g., circuitry, logic, instructions) that implement the functions of an external memory controller (e.g., a host system memory controller), which may be referred to as or be included in a host system controller 120. For example, a host system controller 120 may issue commands or other signaling for operating the memory system 110, such as write commands, read commands, configuration signaling or other operational signaling. In some examples, the host system controller 120, or associated functions described herein, may be implemented by or be part of the processor 125. For example, a host system controller 120 may be hardware, instructions (e.g., software, firmware), or some combination thereof implemented by the processor 125 or other component of the host system 105. In various examples, a host system 105 or a host system controller 120 may be referred to as a host.

The memory system 110 provides physical memory locations (e.g., addresses) that may be used or referenced by the system 100. The memory system 110 may include a memory system controller 140 and one or more memory devices 145 (e.g., memory packages, memory dies, memory chips) operable to store data. The memory system 110 may be configurable for operations with different types of host systems 105, and may respond to commands from the host system 105 (e.g., from a host system controller 120). For example, the memory system 110 (e.g., a memory system controller 140) may receive a write command indicating that the memory system 110 is to store data received from the host system 105, or receive a read command indicating that the memory system 110 is to provide data stored in a memory device 145 to the host system 105, or receive a refresh command indicating that the memory system 110 is to refresh data stored in a memory device 145, among other types of commands and operations.

A memory system controller 140 may include at least one of one or more components (e.g., circuitry, logic, instructions) operable to control operations of the memory system 110. A memory system controller 140 may include hardware or instructions that support the memory system 110 performing various operations, and may be operable to receive, transmit, or respond to commands, data, or control information related to operations of the memory system 110. A memory system controller 140 may be operable to communicate with one or more of a host system controller 120, one or more memory devices 145, or a processor 125. In some examples, a memory system controller 140 may control operations of the memory system 110 in cooperation with the host system controller 120, a local controller 150 of a memory device 145, or any combination thereof. Although the example of memory system controller 140 is illustrated as a separate component of the memory system 110, in some examples, aspects of the functionality of the memory system 110 may be implemented by a processor 125, a host system controller 120, at least one of one or more local controllers 150, or any combination thereof.

Each memory device 145 may include a local controller 150 and one or more memory arrays 155. A memory array 155 may be a collection of memory cells (e.g., a two-dimensional array, a three-dimensional array), with each memory cell being operable to store data (e.g., as one or more stored bits). Each memory array 155 may include memory cells of various architectures, such as random access memory (RAM) cells, dynamic RAM (DRAM) cells, synchronous dynamic RAM (SDRAM) cells, static RAM (SRAM) cells, ferroelectric RAM (FeRAM) cells, magnetic RAM (MRAM) cells, resistive RAM (RRAM) cells, phase change memory (PCM) cells, chalcogenide memory cells, not-or (NOR) memory cells, and not-and (NAND) memory cells, or any combination thereof.

A local controller 150 may include at least one of one or more components (e.g., circuitry, logic, instructions) operable to control operations of a memory device 145. In some examples, a local controller 150 may be operable to communicate (e.g., receive or transmit data or commands or both) with a memory system controller 140. In some examples, a memory system 110 may not include a memory system controller 140, and a local controller 150 or a host system controller 120 may perform functions of a memory system controller 140 described herein. In some examples, a local controller 150, or a memory system controller 140, or both may include decoding components operable for accessing addresses of a memory array 155, sense components for sensing states of memory cells of a memory array 155, write components for writing states to memory cells of a memory array 155, or various other components operable for supporting described operations of a memory system 110.

A host system 105 (e.g., a host system controller 120) and a memory system 110 (e.g., a memory system controller 140) may communicate information (e.g., data, commands, control information, configuration information, timing information) using one or more channels 115. Each channel 115 may be an example of a transmission medium that carries information, and each channel 115 may include one or more signal paths (e.g., a transmission medium, an electrical conductor, a conductive path) between terminals (e.g., nodes, pins, contacts) associated with the components of the system 100. A terminal may be an example of a conductive input or output point of a device of the system 100, and a terminal may be operable as part of a channel 115. To support communications over channels 115, a host system 105 (e.g., a host system controller 120) and a memory system 110 (e.g., a memory system controller 140) may include receivers (e.g., latches) for receiving signals, transmitters (e.g., drivers) for transmitting signals, decoders for decoding or demodulating received signals, or encoders for encoding or modulating signals to be transmitted, among other components that support signaling over channels 115, which may be included in a respective interface portion of the respective system.

A channel 115 may be dedicated to communicating one or more types of information, and channels 115 may include unidirectional channels, bidirectional channels, or both. For example, the channels 115 may include one or more command/address channels, one or more clock signal channels, one or more data channels, among other channels or combinations thereof. In some examples, a channel 115 may be configured to provide power from one system to another (e.g., from the host system 105 to the memory system 110, in accordance with a regulated voltage). In some examples, at least a subset of channels 115 may be configured in accordance with a protocol (e.g., a logical protocol, a communications protocol, an operational protocol, an industry standard), which may support configured operations of and interactions between a host system 105 and a memory system 110. For example, the channel 115 may implement or may include a CXL interface or another interface.

A command/address channel (e.g., a CA channel) may be operable to communicate commands between the host system 105 and the memory system 110, including control information associated with the commands (e.g., address information, configuration information). Commands carried by a command/address channel may include a write command with an address for data to be written to the memory system 110 or a read command with an address of data to be read from the memory system 110.

A clock signal channel may be operable to communicate one or more clock signals between the host system 105 and the memory system 110. Clock signals may oscillate between a high state and a low state, and may support coordination (e.g., in time) between operations of the host system 105 and the memory system 110. In some examples, a clock signal may provide a timing reference for operations of the memory system 110. A clock signal may be referred to as a control clock signal, a command clock signal, or a system clock signal. A system clock signal may be generated by a system clock, which may include one or more hardware components (e.g., oscillators, crystals, logic gates, transistors).

A data channel (e.g., a DQ channel) may be operable to communicate (e.g., bidirectionally) information (e.g., data, control information) between the host system 105 and the memory system 110. For example, a data channel may communicate information from the host system 105 to be written to the memory system 110, or information read from the memory system 110 to the host system 105. In some examples, channels 115 may include one or more error detection code (EDC) channels. An EDC channel may be operable to communicate error detection signals, such as checksums or parity bits, which may accompany information conveyed over a data channel.

In some examples, the host system 105 (e.g., a client of the host system 105) may request an allocation of memory of the memory system 110. A memory manager may receive the request from the host system 105 and may allocate a physical region of memory within the memory system 110 (e.g., the memory device 145). The memory manager may be the memory system controller 140. Additionally, or alternatively, the memory manager may be implemented by, or may be included in, the host system controller 120. For example, the memory manager may be part of an operating system of the host system 105 or a virtual machine hypervisor. The host system controller 120 may receive the request for the allocation of memory (e.g., via a function call or an application programming interface (API)) and may transmit a memory allocation in response to the request. In such examples, the request for the allocation of memory may be received from an application or service running on the host system 105. In some other cases, the host system controller 120 may forward the request to a fabric manager 160, and the fabric manager 160 may determine an allocation of memory responsive to the request. In some examples (e.g., in disaggregated CXL memory systems), the fabric manager 160 may receive the request for memory allocation from the host system 105 and may transmit a memory allocation in response to the request.

An allocation of memory (e.g., memory arrays 155) in the memory system 110 may be based on interleaving the allocation across multiple memory devices 145. The memory devices 145 to be interleaved may be DIMMs or CXL devices (e.g., of a disaggregated memory pool, of a CXL Fabric-Attached Memory (FAM) architecture). For example, memory interleaving may enable a host system 105 to efficiently spread memory access across multiple interleaved memory modules of the memory system. The host system 105 may request an allocation of a memory space within the memory system 110, and the allocated memory space may be interleaved across various regions of one or several memory modules. It may be beneficial for the host system 105 to obtain information about a physical organization (e.g., layout, data structures) of the allocated memory space, which may enable the host system to perform efficient memory access. However, the organization of memory (e.g., interleaving) within the memory system 110 (e.g., within memory devices 145) may be hidden from the host system 105. For example, an indication of memory allocation to the host system 105 may indicate a pointer to a logical address associated with the allocated memory space, but the indication may lack any information about the underlying physical data structures of the allocated memory space.

In accordance with examples described herein, a memory manager (e.g., the memory system 110, the host system 105, the fabric manager 160) may indicate an allocation of a memory space and performance records that indicate latency information for subsets of addresses (e.g., address boundaries) within the memory space. For example, the memory manager may allocate a physical region of memory that includes memory boundaries (e.g., rows, banks, ranks, planes). Accessing memory within the different memory boundaries (e.g., opening a new row) may correspond to varying latency costs. Thus, the performance records may indicate to the host system 105 a mapping between the subsets of addresses within the memory space and corresponding latency costs associated with accessing addresses within the subsets or crossing the boundaries between subsets. In some examples, the host system 105 may sort (e.g., organize, rearrange) data for storage within the memory system 110 based on the performance records associated with the allocated memory space. For example, the host system 105 may perform one or more vector-based search algorithms (e.g., generate a graph) to determine logically similar data (e.g., nearest neighbors) within a data set. The host system 105 may store logically similar data in adjacent memory within the memory space, which may support more efficient memory access of similar data that is frequently accessed together.

Figure 2A:
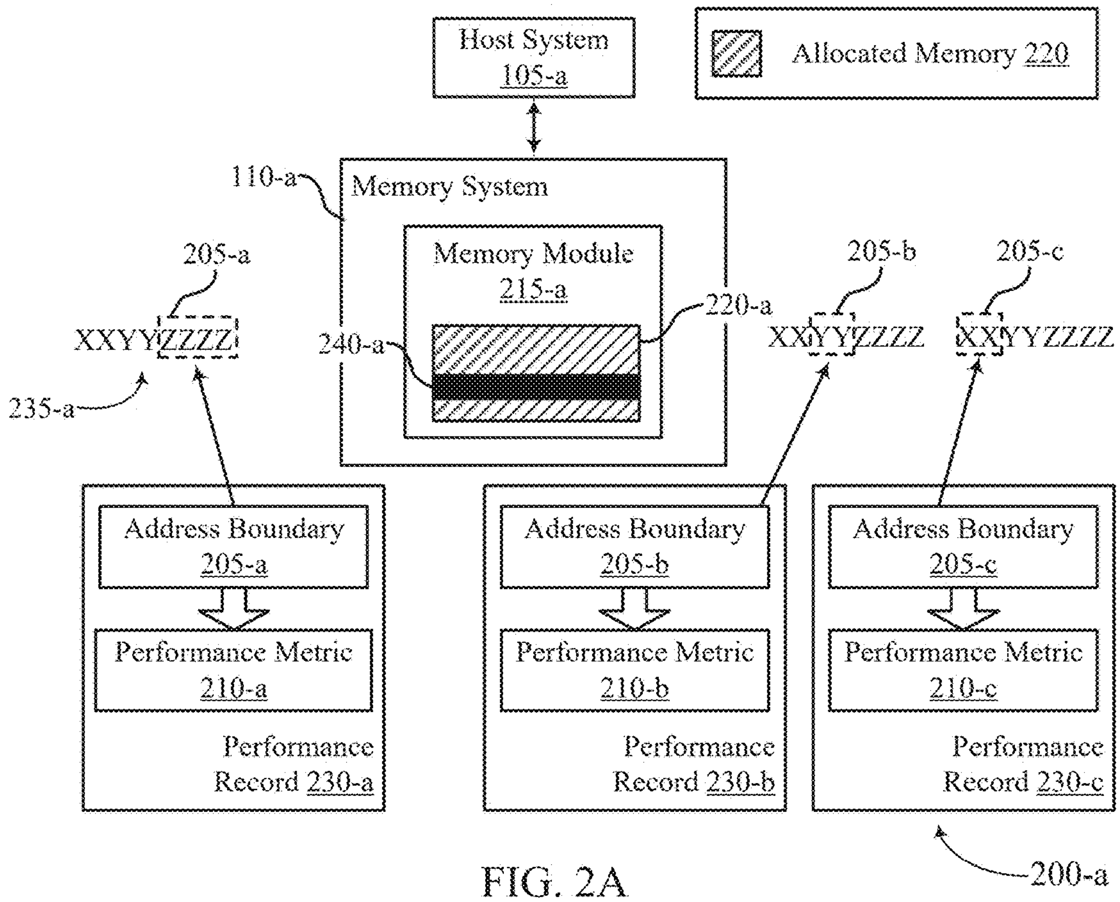
FIGS. 2A and 2B show examples of architectures that support systems for software optimization of data layout in accordance with examples as disclosed herein.
Figure 2B:
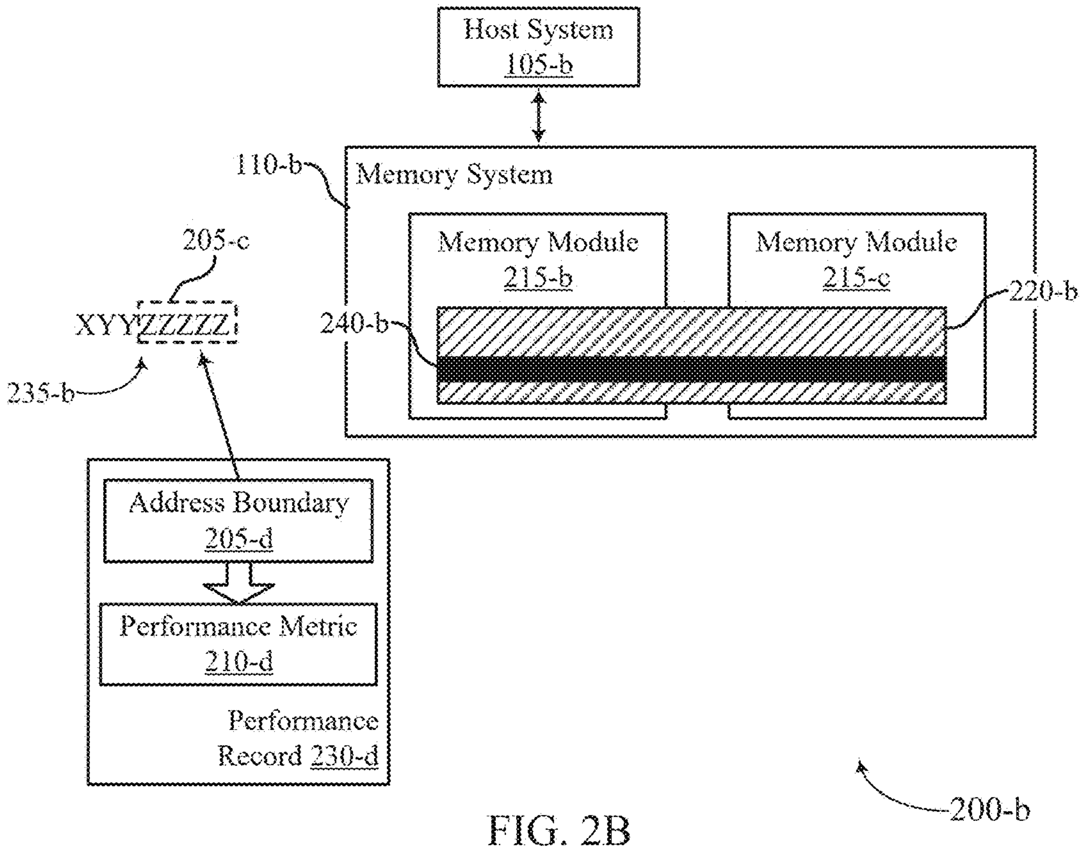

FIGS. 2A and 2B show examples of an architecture 200-*a* and an architecture 200-*b* that support systems for software optimization of data layout in accordance with examples as disclosed herein. The architecture 200-*a* and the architecture 200-*b* may implement or may be implemented by aspects of the system 100. For example, the architecture 200-*a* may include a host system 105-*a* and a memory system 110-*a*, and the architecture 200-*b* may include a host system 105-*b* and a memory system 110-*b*, which may be examples of corresponding devices described herein. The architecture 200-*a* may include a memory module 215-*a* and the architecture 200-*b* may include a memory module 215-*b* and a memory module 215-*c*, which may be examples of memory devices 145 as described with reference to FIG. 1.

A memory manager of the memory system 110-*a* may allocate memory 220-*a* to the host system 105-*a*, and the allocated memory 220-*a* may be of a single memory module 215-*a* (e.g., an in-server DIMM, a dynamically allocated CXL device). The allocated memory 220-*a* may be a physical region of memory within the memory system 110-*a*. In some examples, the memory manager may receive a request, from the host system 105-*a*, for an allocation of a memory space, and the memory manager may allocate the memory 220 based on the request. The memory space may include a range of addresses (e.g., physical addresses, logical addresses) that corresponds to the allocated memory 220. The allocated memory 220 may include one or more regions 240. The memory regions 240 may be organized according to data structures (e.g., organizational structures) of memory within the memory system 110-*a* (e.g., within the memory module 215-*a*), and memory boundaries may refer to divisions between memory regions 240 (e.g., may distinguish where a first memory region 240 ends and a second memory region 240 begins). For example, the memory regions 240 may be (e.g., may be based on) a cache line, a row, a bank, or a rank associated with the memory system 110-*a*. Additionally, or alternatively, the memory regions 240 may be (e.g., or may be based on) a block, a plane, or a memory die associated with the memory system 110-*a* (e.g., a NAND memory device).

Memory boundaries may be, or may refer to, a cache line size, a row size, a block size, a plane size, a quantity of planes, a quantity of memory die, a quantity of memory ranks, or a combination thereof. For illustrative purposes, the memory region 240-*a* may be a row of the allocated memory 220-*a* within the memory system 110-*a*. The memory region 240-*b* may be a row of the allocated memory 220-*b* within the memory system 110-*b*. In the memory system 110-*b*, the allocated memory 220-*b* may be based on interleaving the memory module 215-*b* and the memory module 215-*c*, which may result in the memory region 240-*b* having a larger size (e.g., larger row size) than a corresponding memory region 240-*a* within the memory system 110-*a*. Memory boundaries associated with the memory system 110-*b* may be different from memory boundaries associated with the memory system 110-*a* due to interleaving (e.g., of memory module 215-*a* and memory module 215-*b*).

The memory manager may transmit an indication of the memory space requested by the host system 105-*a*. For example, the memory manager may transmit a pointer to a start (e.g., a beginning address) of the range of addresses included in the memory space. In addition to the indication of the memory space, the memory manager may indicate additional performance information about the memory space. For example, the memory manager may indicate performance records 230. Each performance record 230 may indicate an address boundary 205 (e.g., a subset of bits) within an address 235 and a performance metric 210 indicating a performance associated with the address boundary 205.

The address boundary 205 may be a subset of bits within an address 235, and traversal of addresses within the address boundary 205 (e.g., using sequential access, random access) may correspond to traversing memory that is physically located within a region 240. For example, accessing memory within a region 240-*a* (e.g., and not outside of the region 240-*a*) may be based on modifying the subset of bits (e.g., bits 0 through 3) within the address boundary 205-*a* of the address 235-*a*, without modifying higher (e.g., more significant) bits of the address 235-*a* (e.g., bits 4 through 7). To access memory outside of the region 240-*a*, a higher bit of the address 235-*a* may be modified, which may correspond to crossing over the address boundary 205 (e.g., an address boundary 205-*a*) into bits associated with a second address boundary 205-*b* (e.g., and thus a second performance metric 210). In some examples, the address boundary 205 may be indicated by a start and end address bit range (e.g., bits 0 through 3) or a list of address bits (e.g., a contiguous list of address bits, a non-contiguous list of address bits). The performance metric 210-*a* may indicate a latency metric (e.g., minimum and/or maximum latency) or an access energy (e.g., minimum and/or maximum access energy) for memory access within the address boundary 205.

The memory manager may indicate or transmit (e.g., via a memory interface bus, such as a CXL interface) the memory space corresponding to the allocated memory 220-*a* and one or more performance records 230. For example, the memory manager may transmit a performance record 230-*a*, a performance record 230-*b*, and a performance record 230-*c*, to the host system 105-*a*. The performance record 230-*a* may correspond to a first subset of bits (e.g., bit positions, bit indices) of the address 235-*a*, indicated by the address boundary 205-*a*, the performance record 230-*b* may correspond to a second subset of bits within the address 235-*a*, indicated by the address boundary 205-*b*, and the performance record 230-*c* may correspond to a third subset of bits within the address 235-*a*, indicated by the address boundary 205-*c*. The performance record 230-*a* may include a performance metric 210-*a* which indicates a performance associated with memory access within the address boundary 205-*a* (e.g., without crossing over the address boundary 205-*a*). The performance record 230-*b* may include a performance metric 210-*b* which indicates a performance associated with memory access within the address boundary 205-*b*. The performance record 230-*c* may include a performance metric 210-*c* which indicates a performance associated with memory access within the address boundary 205-*c*.

In some examples, the performance metric 210-*a* may indicate a lower latency than the performance metric 210-*b* (e.g., or the performance metric 210-*b* may indicate a lower latency than the performance metric 210-*c*). In such examples, access within the address boundary 205-*b* may be associated with traversing physical memory across different memory regions 240 (e.g., rows, banks, or ranks), as opposed to access within the address boundary 205-*a*, which may traverse physical memory within the memory region 240-*a*. For example, there may be a relatively high latency cost associated with crossing from the address boundary 205-*a* to the address boundary 205-*b* (e.g., opening a new row, a new bank, or a new rank, moving from a memory region 240-*a* to a different memory region 240).

In some other examples, such as for a memory system 110-*b* which implements interleaving (e.g., interleaving of memory modules 215, rows, banks, ranks, blocks, planes, memory dies), the performance metric 210-*b* may indicate a lower latency than the performance metric 210-*a* (e.g., or the performance metric 210-*c* may indicate a lower latency than the performance metric 210-*b*). In such examples, memory within different memory regions 240-*a* (e.g., different rows, banks, ranks, etc.) may be accessed in parallel, which may result in more efficient memory access based on accessing memory within different memory regions 240-*a*, as opposed to accessing memory within the same memory region 240-*a*. In this way, there may be a performance gain (e.g., a reduction in latency) associated with traversing addresses that modify bits within the address boundary 205-*b* (e.g., without changing bits within other address boundaries 205, such as the address boundary 205-*c*).

In some examples, a memory system 110-*b* may include a memory module 215-*b* (e.g., an in-server DIMM, a dynamically allocated CXL device) interleaved with a memory module 215-*c*. Because the modules 215 are interleaved, a row size of the memory system 110-*b* (e.g., 16 KB row size) may be larger than a row size of the memory system 110-*a* (e.g., 8 KB row size). Addresses of the allocated memory 220-*b* that are within the memory module 215-*b* and the memory module 215-*c* may share a same row, and a single memory region 240-*b* may include both the memory module 215-*b* and the memory module 215-*c*. The memory manager may indicate, to a host system 105-*b* (e.g., via a memory interface bus, such as a CXL interface), a memory space (e.g., a range of addresses) corresponding to the allocated memory 220-*b* and a performance record 210-*d* indicating a performance of memory accesses within the allocated memory 220-*b*. The performance record 230-*d* may indicate an address boundary 205-*d*, which may correspond to a row (e.g., 16 KB row) within the allocated memory 220-*b*.

As a result of the memory region 240-*a* of the memory system 110-*a* being a different size than a corresponding memory region 240-*b* of the memory system 110-*b* (the row size of the memory system 110-*a* being different than that of the memory system 110-*b*), an address boundary 205-*c* (e.g., bits 0 through 4) for an address 235-*b* may be different (e.g., a different quantity of bits, a different list of bits) than the corresponding address boundary 205-*a* (e.g., bits 0 through 3) for the address 235-*a*. A host system 105 may identify an organization of memory within a corresponding memory system 110 based on sizes or quantities of address boundaries 205, or differences in performance metrics 210 (latencies, access energies) between the address boundaries 205, or a combination thereof. In an illustrative example, the host system 105-*b* may identify that memory modules 215 within the memory system 110-*b* are interleaved, while the host system 105-*a* may identify that the memory system 110-*a* does not implement interleaving of memory modules 215.

In some examples, the memory manager may, as part of allocating a memory space to a host system 105, translate physical addresses of a physical region of allocated memory 220 to corresponding logical addresses (e.g., device addresses). In accordance with examples described herein, the memory manager may disable a translation of physical addresses to logical addresses such that the address boundaries 205 that are indicated via the performance records 230 indicate information pertaining to physical addresses of the allocated memory 220. In some examples, some translation (e.g., or scrambling) may be performed on (e.g., or enabled for) the physical addresses of the physical region of allocated memory 220, but the translation may have no impact on the memory boundaries within physical memory for which the address boundaries 205 indicate. For example, the memory system 110-*a* may perform address translation (e.g., physical-to-device address translation) for addresses within the memory region 240-*a*, and after the translation, the address boundaries 205 may maintain the mapping between the bit positions of the address 235 and the locations or properties of memory boundaries (e.g., or of memory regions 240) within physical memory. Additionally, or alternatively, the memory manager may indicate one or more scrambling operations that are performed on the addresses associated with the indicated address boundaries 205, and the one or more scrambling operations may indicate a mapping between the indicated addresses and the physical locations of memory that the indicated addresses correspond to. By indicating performance information (e.g., latency, access energy) pertaining to the physical addresses within the allocated memory 220 in the memory systems 110, the memory manager may enable the host systems 105 to determine an organization of memory within the memory system 110. The organization of memory may include a row size, a block size, a plane size, a quantity of planes, a quantity of memory die, a quantity of memory ranks, or a combination thereof.

The memory system 110-*a*, the memory system 110-*b*, or both (e.g., which may be NAND systems) may perform garbage collection operations to transfer (e.g., or overwrite) data within the memory systems 110. In some examples, a memory system 110 (e.g., a memory manager of the memory system 110) may disable garbage collection operations (e.g., or may request a host system 105 to disable garbage collection or other data transfer operations) based on transmitting or maintaining the performance records 230 (e.g., for a duration, for a range of addresses, or both). Additionally, or alternatively, the memory system 110 may transfer, as part of a garbage collection operation, data from a first set of physical addresses to a second set of physical addresses. Both the first set of physical addresses and the second set of physical addresses may be associated with a same performance metric 210 (e.g., a set of performance metrics). For example, the memory system 110 may maintain, for each memory region 240, a physical region of memory that is larger (e.g., twice the size) than the range of addresses indicated to the host system 105 for allocation of the memory region 240, and the memory system 110 may perform garbage collection within the larger physical region of memory to maintain the characteristics (e.g., address boundaries 205, performance metrics 210) indicated by the performance records 230. In some examples, during garbage collection, the memory system 110 may transfer data from a first memory region 240 (e.g., a row, a block, a bank, a plane) to a second memory region 240, the second memory region adhering to the same address boundary 205 and the same performance metric 210 as the first memory region 240 (e.g., based on the memory regions 240 being of a same type, or being at a same organizational level of memory), while other data (e.g., demapped data) may be removed from the first memory region 240. In some cases, when data is removed from a memory region 240, the memory systems 110 may insert dummy data to the memory region 240 such that the address boundaries 205 are maintained after data removal.

In some examples, a page size corresponding to the allocated memory 220 may be determined or modified in accordance with the address boundaries 205. For example, the host system 105-*a* may receive the allocation of the memory 220 and the indication of the performance records 230, and the host system 105-*a* may request a different page size based on a mismatch (e.g., a difference) between the current page size and the address boundary 205-*a* with the lowest latency. For example, the current page size may be insufficient for access of addresses within an address boundary 205. In some examples, the memory system 110 may dynamically modify the page size (e.g., via a page size entry in a page table, via one or more parameters of page tables within a translation lookaside buffer (TLB)) such that the page size aligns with (e.g., is greater than or equal to) a size of the address boundary 205, which may enable the host system 105 to perform reorganization of data within the address boundary 205 (e.g., as described in greater detail with reference to FIGS. 3A and 3B).

Figure 3A:
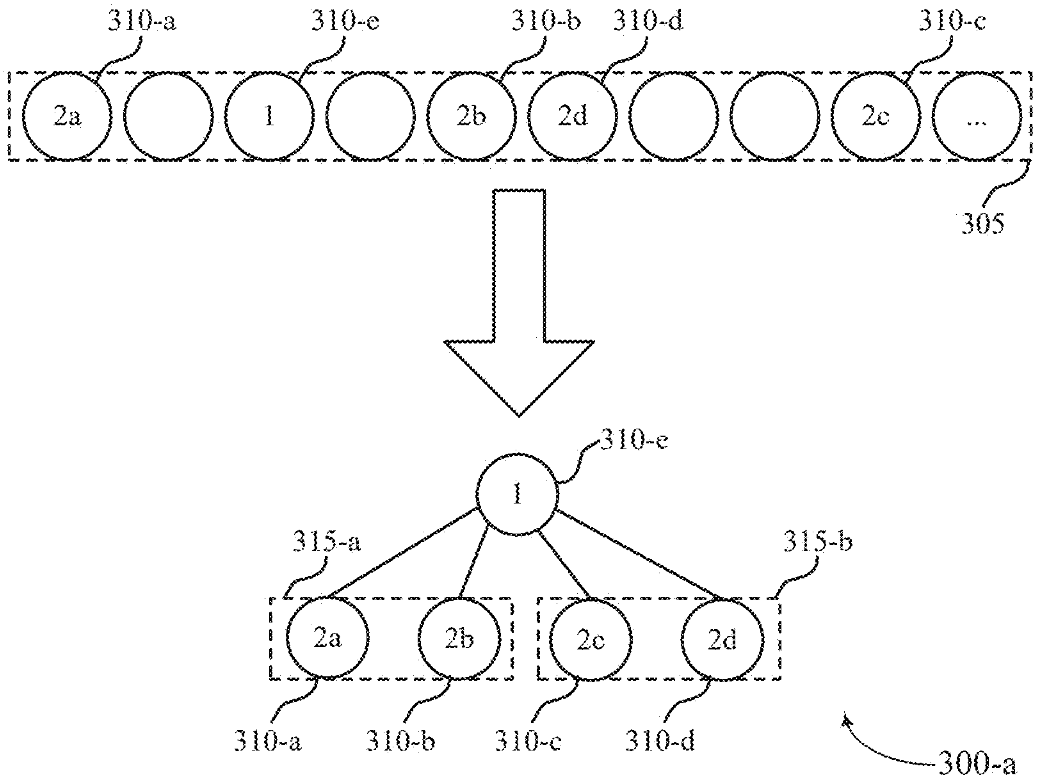
FIGS. 3A and 3B show examples of sorting schemes that support systems for software optimization of data layout in accordance with examples as disclosed herein.
Figure 3B:
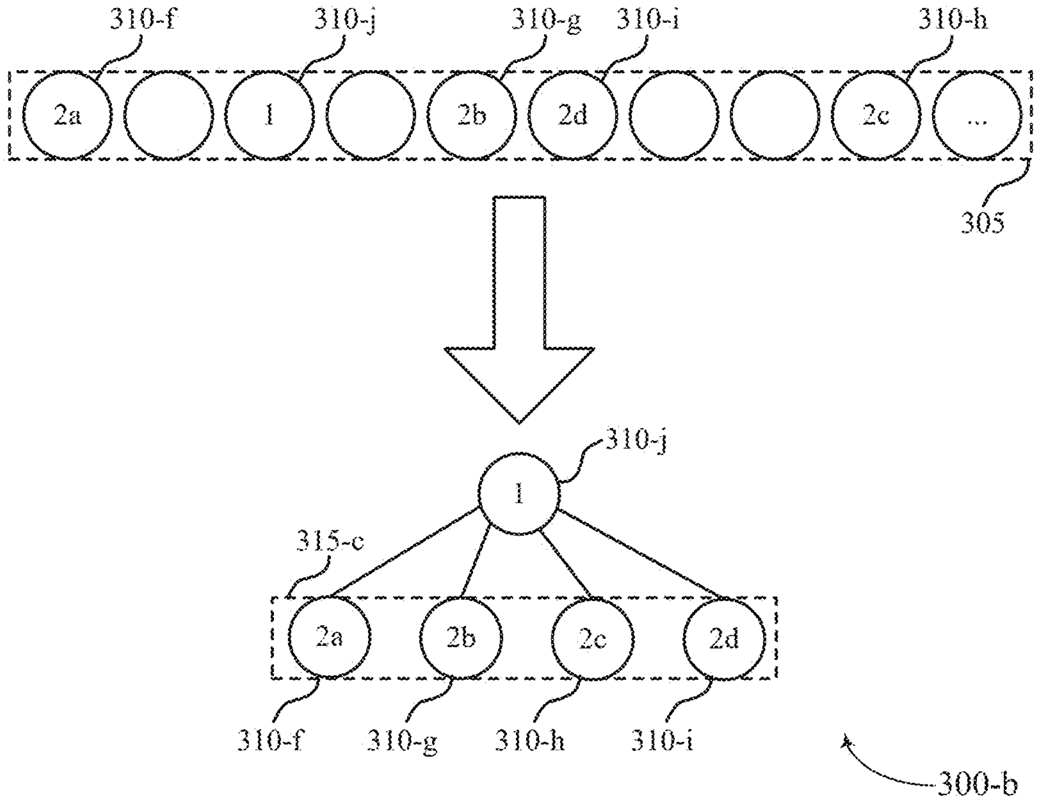

FIGS. 3A and 3B show examples of a sorting scheme 300-*a* and a sorting scheme 300-*b* that support systems for software optimization of data layout in accordance with examples as disclosed herein. The sorting scheme 300-*a* and the sorting scheme 300-*b* may implement or may be implemented by aspects of the system 100, the architecture 200-*a*, or the architecture 200-*b*. For example, the sorting scheme 300-*a* may include a memory region 315-*a* and a memory region 315-*b*, and the sorting scheme 300-*b* may include a memory region 315-*c*, which may be examples of memory regions 240, as described with reference to FIGS. 2A and 2B.

A database 305 may store a data set that includes multiple vertices 310 (e.g., data points). The vertices 310 may be scattered (e.g., randomly) in memory (e.g., in a physical memory space of a memory device 145). Each vertex 310 of the database may correspond to a portion of data (e.g., an image, a quantity, a data point) within the data set. In some cases, the vertices 310 may be floating point numbers. In some examples, an indexing algorithm (e.g., a sorting algorithm, a graph algorithm) may generate a graph (e.g., an index, graph information) that sorts the data set such that vertices 310 that are logically adjacent (e.g., similar) are connected by a logical edge in the graph that connects the vertices 310. In some examples, the graph may indicate respective path distances between respective vertices 310 of the data set. The indexing algorithm may be an approximate nearest neighbor search (ANNS) algorithm, a hierarchical navigable small worlds (HNSW) algorithm, or another indexing or sorting algorithm.

In some examples, multiple search queries may be performed using the graph (e.g., the index). During a search query, a query vertex 310-*e* may be selected, and the graph may output a set of vertices 310 that satisfy a threshold distance (e.g., quantity of edges, edge distance) from the query vertex 310-*e* according to the generated graph. Though the vertices 310 (e.g., a vertex 310-*a*, a vertex 310-*b*, a vertex 310-*d*, and a vertex 310-*c*) may be scattered in the database 305, the graph information may organize the vertices 310 (e.g., which may be referred to as nearest neighbors) such that the vertices 310 are connected via edges in the graph. In some examples, a threshold path distance (e.g., quantity of edges) between a first vertex 310-*a* and a second vertex 310-*b* may indicate that the first vertex 310-*a* and the second vertex 310-*b* are logically similar (e.g., and are to be grouped or stored together in memory).

In some examples, a host system may perform the indexing algorithm to generate the graph. As part of the indexing, or after indexing is complete, the host system may sort the data set (e.g., of the vertices 310) for storage in a memory system. The host system may group vertices 310 of the data set within subsets of addresses of a memory space within the memory system such that vertices 310 that are logically similar are physically adjacent in memory. The sorting of data by the host system into a memory space that is allocated to the host system for storage of the data may be based on performance properties (e.g., latencies, access energies) of address boundaries associated with the allocated memory space (e.g., which may be indicated via performance records 230, as described in greater detail with reference to FIGS. 2A and 2B).

For example, the host system may group vertices 310 having relatively lower path distances (e.g., path distances satisfying a path distance threshold) within an address boundary (e.g., an address boundary 205) of relatively lower latency. In some examples, when grouping the vertices 310 into the address boundary, the host system may use only a subset of addresses within the address space (e.g., and other addresses within the address boundary may go unused). Thus, in some cases there may be gaps within a region based on the address boundary. For example, the host system may store 8 vertices having low path distances with each other within an address boundary with space to store 12 vertices, and may then move to the next region (e.g., may cross the address boundary) to store the next set of vertices. The host system may (e.g., at a later time) identify a different set of 4 vertices that have low path distances with each other, and the host system may store the set of 4 vertices in the remaining space in the address boundary. In some other examples, the host system may group vertices 310 having relatively higher path distances in addresses that are not grouped within any particular address boundaries. For example, the host system may ignore the address boundaries based on the path distances of the vertices 310, allowing for the vertices 310 to be stored in addresses that cross address boundaries which may have higher latency metrics.

In the example of FIG. 3A, each memory region 315 (e.g., row buffer) of the memory system may have space available for two vertices 310. The host system may sort the vertices 310 such that the vertex 310-*a* and the vertex 310-*b* occupy a memory region 315-*a* (e.g., a row) of the memory system and the vertex 310-*c* and the vertex 310-*d* occupy a memory region 315-*b* of the memory system based on the path distances between vertices 310-*a* and 310-*b* and between vertices 310-*c* and 310-*d* being relatively smaller (e.g., than the path distances between vertex 310-*a* and vertices 310-*c* and 310-*d*, or between vertex 310-*b* and vertices 310-*c* and 310-*d*). The memory region 315-*b* may be adjacent to the memory region 315-*a* in memory. In the example of FIG. 3B, each memory region 315 (e.g., a memory region 315-*c*) of the memory system may have space available for four vertices 310 (e.g., memory region 315-*c* may have a larger size than that of the memory region 315-*a* and the memory region 315-*b* due to interleaving, as described in greater detail with reference to FIGS. 2A and 2B). In such examples, the vertex 310-*f*, the vertex 310-*g*, the vertex 310-*h*, and the vertex 310-*i* (having path distances shown relative to query vertex 310-*j*) may be grouped together to occupy the memory region 315-*c* based on the path distances between vertices 310-*f*, 310-*g*, 310-*h*, and 310-*i* being relatively smaller (e.g., than the path distances between these vertices and other vertices). The memory regions 315 may correspond to one or more cache lines, rows, banks, ranks, blocks, planes, dies, or other regions of memory.

Sorting of the vertices 310 of the data set may be in accordance with performance records that are indicated with a memory allocation, as described in greater detail with reference to FIGS. 2A and 2B. For example, the host system may request an allocation of memory in a memory system to store the vertices 310 of the data set 305. The host system may receive (e.g., from a memory manager, such as a memory system controller 140) an indication of a memory space (e.g., a range of addresses) for memory allocation at the memory system and performance records that indicate address boundaries (e.g., subsets of addresses within the memory space) and performance metrics (e.g., latencies, access energies) corresponding to each address boundary. The host system may sort the data set for storage in the memory system such that the vertices 310 that are connected by graph edges, or the vertices 310 that satisfy a threshold path distance in the graph, are stored in addresses of the allocated memory space that correspond to relatively low latency metrics (e.g., based on a threshold latency, based on a comparison of latency metrics between address boundaries of the memory space) according to the performance records. By storing the connected vertices 310 of the data set in adjacent memory and within subsets of addresses corresponding to low latency (e.g., in address boundaries of the memory space associated with the lowest latency relative to other address boundaries), the host system may support increased efficiency and lower latency of search queries performed on data within a database 305.

Figure 4:
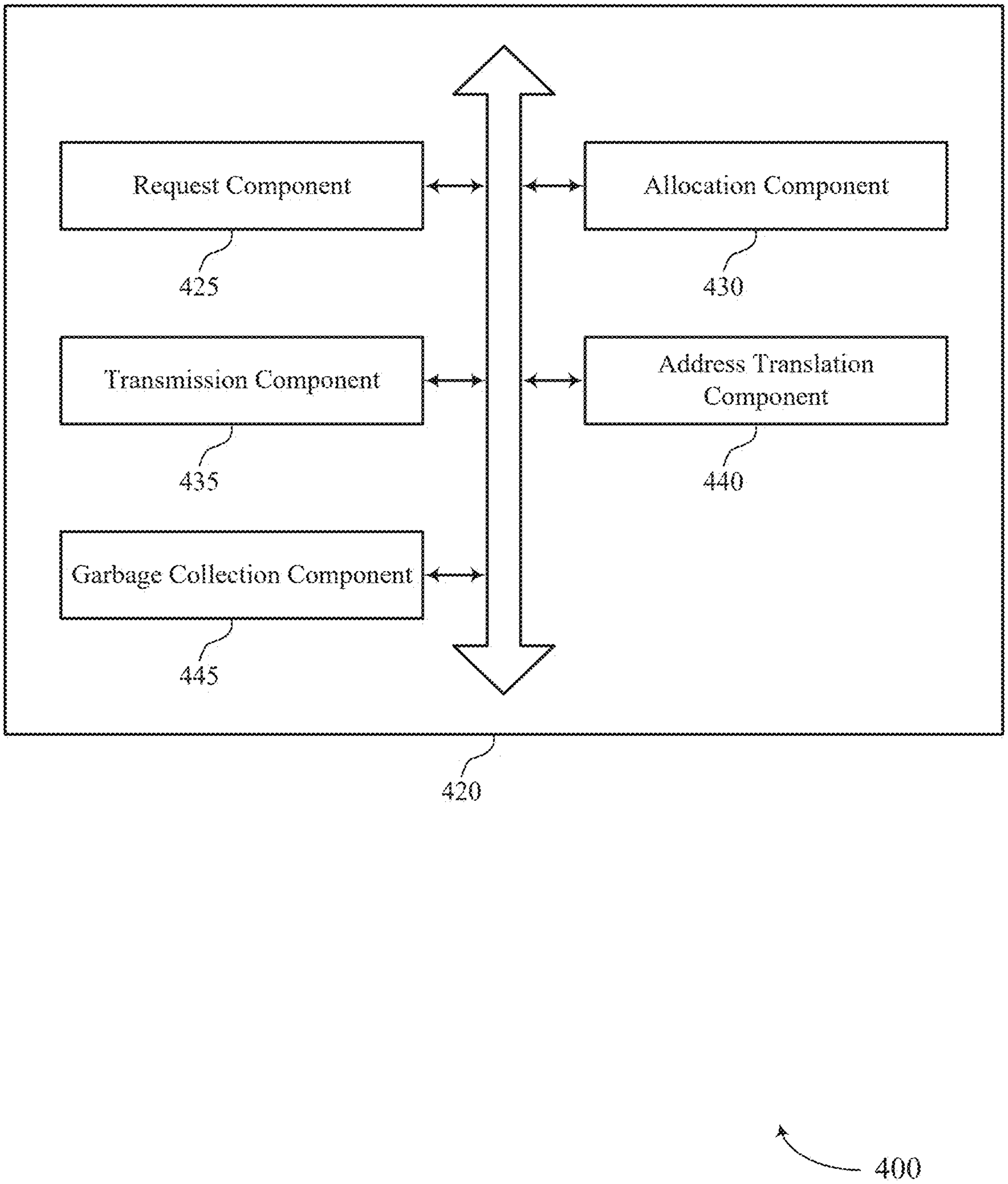
FIG. 4 shows a block diagram of a memory system that supports systems for software optimization of data layout in accordance with examples as disclosed herein.

FIG. 4 shows a block diagram 400 of a memory system 420 that supports systems for software optimization of data layout in accordance with examples as disclosed herein. The memory system 420 may be an example of aspects of a memory system as described with reference to FIGS. 1 through 3B. The memory system 420, or various components thereof, may be an example of means for performing various aspects of systems for software optimization of data layout as described herein. For example, the memory system 420 may include a request component 425, an allocation component 430, a transmission component 435, an address translation component 440, a garbage collection component 445, or any combination thereof. Each of these components, or components of subcomponents thereof (e.g., one or more processors, one or more memories), may communicate, directly or indirectly, with one another (e.g., via one or more buses).

The request component 425 may be configured as or otherwise support a means for receiving a request for an allocation of a memory space, the memory space including a range of addresses in a memory system (e.g., a memory system 110). The allocation component 430 may be configured as or otherwise support a means for allocating, based on the request, a physical region of memory (e.g., allocated memory 220) that includes one or more memory boundaries. The transmission component 435 may be configured as or otherwise support a means for transmitting, based on the request and on the allocation of the physical region, an indication of the memory space and one or more performance records (e.g., performance records 230) associated with one or more address boundaries (e.g., address boundaries 205) within the memory space, where each address boundary of the one or more address boundaries is associated with a respective latency metric (e.g., performance metrics 210) based on the one or more memory boundaries, and where each performance record indicates a respective address boundary of the one or more address boundaries and the respective latency metric associated with the respective address boundary.

In some examples, each performance record indicates a respective set of bits indicating a respective set of addresses within the memory space. In some examples, the respective latency metric applies to the respective set of addresses.

In some examples, the physical region of allocated memory associated with the memory space spans a plurality of interleaved memory modules (e.g., memory modules 215) of the memory system. In some examples, the one or more memory boundaries are based on the plurality of interleaved memory modules.

In some examples, at least one address boundary of the one or more address boundaries corresponds to a respective interleaved memory module of the plurality of interleaved memory modules. In some examples, the respective latency metric associated with the at least one address boundary is based on the corresponding interleaved memory module.

In some examples, to support transmitting the indication of the memory space and the one or more performance records, the transmission component 435 may be configured as or otherwise support a means for transmitting the indication of the memory space and the one or more performance records via a memory interface bus (e.g., channels 115) of the memory system.

In some examples, the address translation component 440 may be configured as or otherwise support a means for disabling, at the memory system, a translation procedure associated with translating physical addresses of the physical region of allocated memory to corresponding logical addresses, where the indication of the memory space and the one or more performance records is based on the disabling.

In some examples, the garbage collection component 445 may be configured as or otherwise support a means for transferring, as part of a garbage collection operation, data from a first set of physical addresses to a second set of physical addresses, where both the first set of physical addresses and the second set of physical addresses are associated with a same set of latency metrics.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
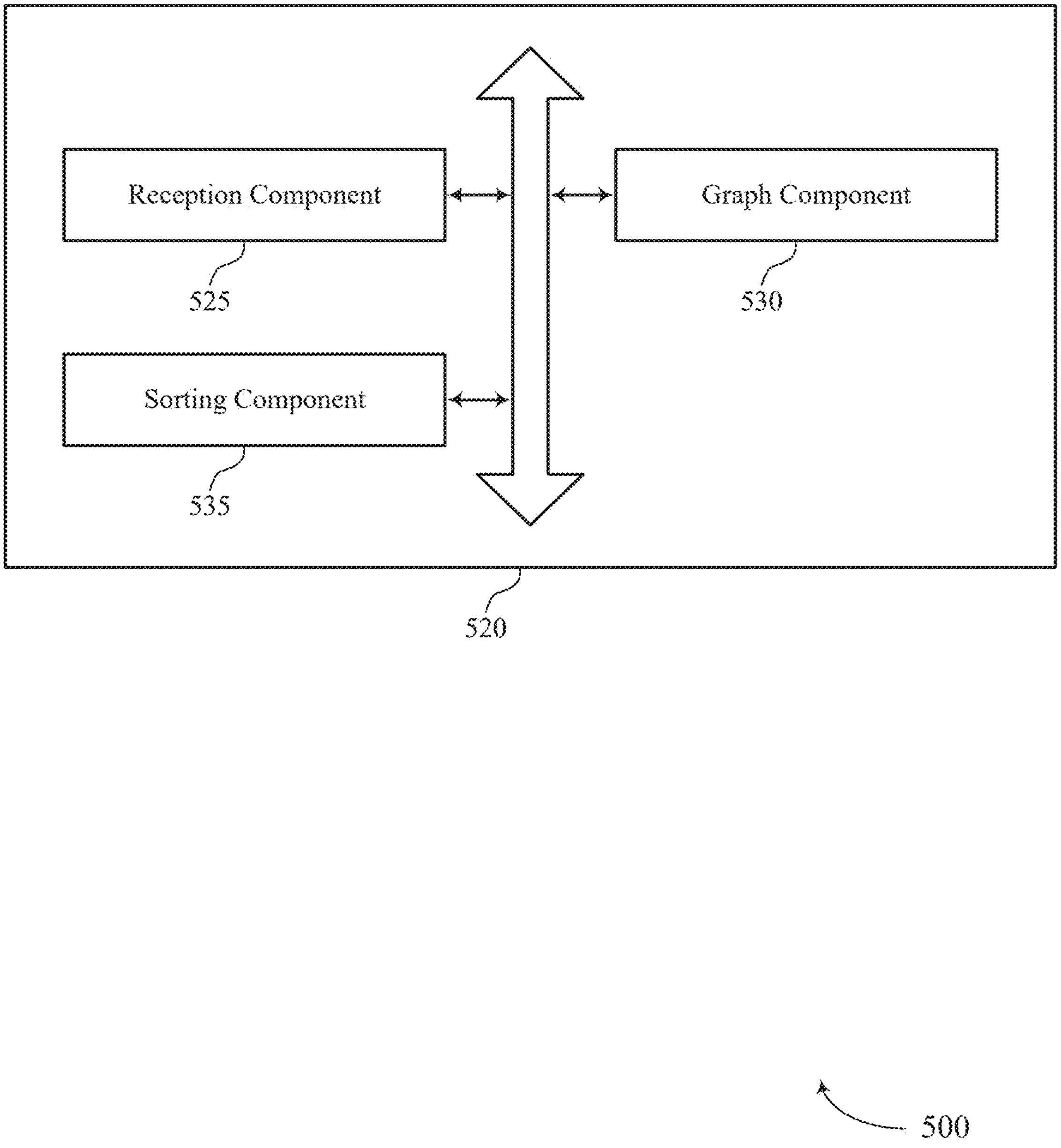
FIG. 5 shows a block diagram of a host system that supports systems for software optimization of data layout in accordance with examples as disclosed herein.

FIG. 5 shows a block diagram 500 of a host system 520 that supports systems for software optimization of data layout in accordance with examples as disclosed herein. The host system 520 may be an example of aspects of a host system as described with reference to FIGS. 1 through 3B. The host system 520, or various components thereof, may be an example of means for performing various aspects of systems for software optimization of data layout as described herein. For example, the host system 520 may include a reception component 525, a graph component 530, a sorting component 535, or any combination thereof. Each of these components, or components of subcomponents thereof (e.g., one or more processors, one or more memories), may communicate, directly or indirectly, with one another (e.g., via one or more buses).

The reception component 525 may be configured as or otherwise support a means for receiving an indication of a memory space for memory allocation at a memory system (e.g., a memory system 110) and one or more performance records (e.g., performance records 230) associated with one or more address boundaries (e.g., address boundaries 205) within the memory space, where the memory space includes a range of addresses in the memory system, and where each performance record indicates a respective address boundary of the one or more address boundaries and a respective latency metric associated with the respective address boundary. The graph component 530 may be configured as or otherwise support a means for generating graph information for a plurality of vertices (e.g., vertices 310) of a data set (e.g., a database 305), each vertex of the plurality of vertices corresponding to a portion of data within the data set, where the graph information indicates respective path distances between respective vertices of the plurality of vertices. The sorting component 535 may be configured as or otherwise support a means for sorting the data set for storage in the memory space based on the graph information and the one or more performance records associated with the memory space, where sorting the data set includes grouping one or more vertices of the data set within a subset of addresses (e.g., a memory region 315-*a*, a memory region 315-*b*, a memory region 315-*c*) of the range of addresses based on the respective path distances between the one or more vertices satisfying a first threshold and the respective latency metrics associated with the respective address boundaries.

In some examples, each performance record indicates a respective set of bits indicating a respective set of addresses within the memory space. In some examples, the respective latency metric applies to the respective set of addresses.

In some examples, to support receiving the indication of the memory space for memory allocation and the one or more performance records, the reception component 525 may be configured as or otherwise support a means for receiving the indication of the memory space and the one or more performance records via a memory interface bus (e.g., channels 115) of the memory system.

In some examples, the sorting component 535 may be configured as or otherwise support a means for determining, based on the one or more performance records associated with the one or more address boundaries, an organization of memory within the memory system, where sorting the data set is based on determining the organization of memory within the memory system.

In some examples, the organization includes a row size, a block size, a bank size, a plane size, a quantity of planes, a quantity of memory die, a quantity of memory ranks, or a combination thereof.

In some examples, generating the graph information is based on an approximate nearest neighbor search (ANNS) graph algorithm.

In some examples, the described functionality of the host system 520, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the host system 520, or various components thereof, may be implemented at least in part by instructions (e.g., stored in memory, non-transitory computer-readable medium) executable by such at least one processor.

Figure 6:
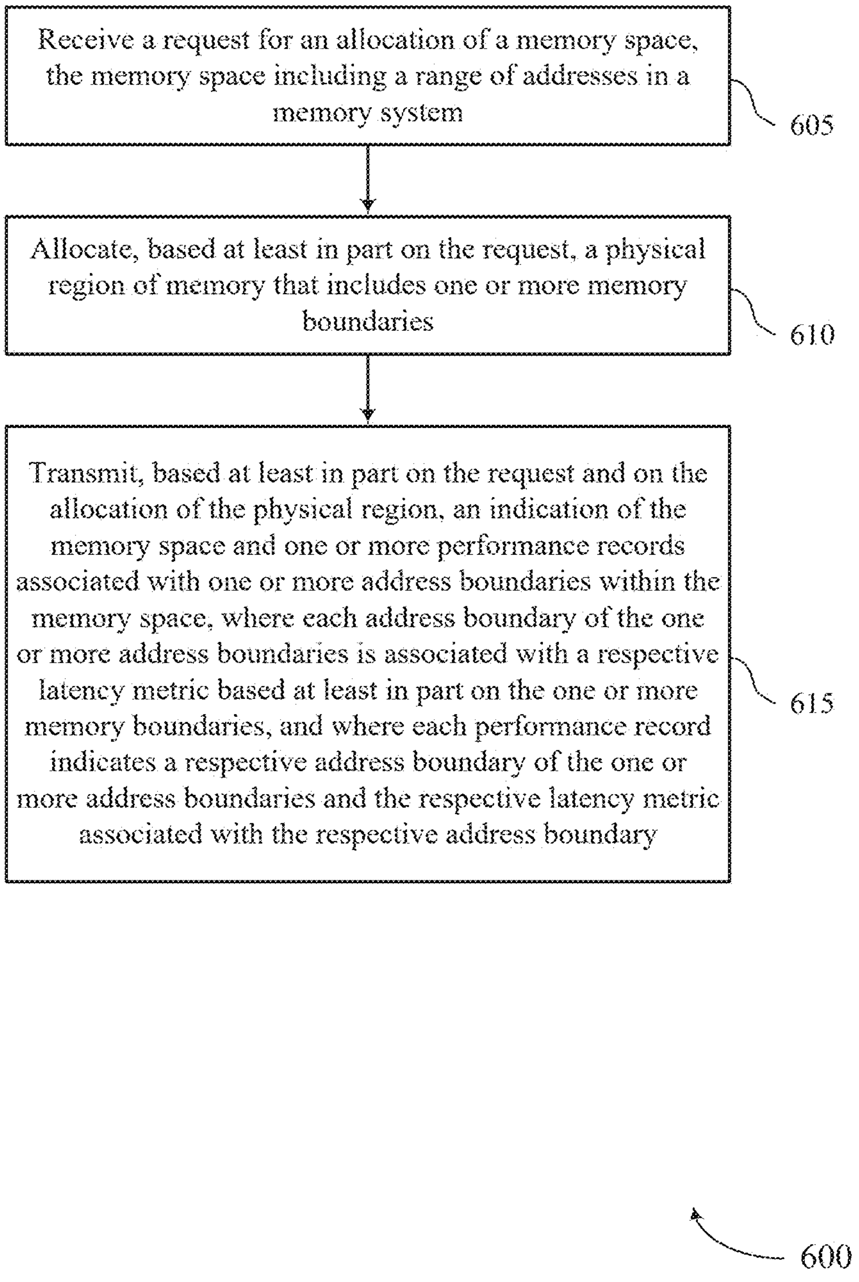
FIGS. 6 and 7 show flowcharts illustrating a method or methods that support systems for software optimization of data layout in accordance with examples as disclosed herein.

FIG. 6 shows a flowchart illustrating a method 600 that supports systems for software optimization of data layout in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include receiving a request for an allocation of a memory space, the memory space including a range of addresses in a memory system (e.g., a memory system 110). In some examples, aspects of the operations of 605 may be performed by a request component 425 as described with reference to FIG. 4.

At 610, the method may include allocating, based on the request, a physical region of memory (e.g., allocated memory 220) that includes one or more memory boundaries (e.g., memory boundaries). In some examples, aspects of the operations of 610 may be performed by an allocation component 430 as described with reference to FIG. 4.

At 615, the method may include transmitting, based on the request and on the allocation of the physical region, an indication of the memory space and one or more performance records (e.g., performance records 230) associated with one or more address boundaries (address boundaries 205) within the memory space, where each address boundary of the one or more address boundaries is associated with a respective latency metric (e.g., a performance metric 210) based on the one or more memory boundaries, and where each performance record indicates a respective address boundary of the one or more address boundaries and the respective latency metric associated with the respective address boundary. In some examples, aspects of the operations of 615 may be performed by a transmission component 435 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a request for an allocation of a memory space, the memory space including a range of addresses in a memory system; allocating, based on the request, a physical region of memory that includes one or more memory boundaries; and transmitting, based on the request and on the allocation of the physical region, an indication of the memory space and one or more performance records associated with one or more address boundaries within the memory space, where each address boundary of the one or more address boundaries is associated with a respective latency metric based on the one or more memory boundaries, and where each performance record indicates a respective address boundary of the one or more address boundaries and the respective latency metric associated with the respective address boundary.

Aspect 2: The method, apparatus, or non-transitory computer-readable medium of aspect 1, where each performance record indicates a respective set of bits indicating a respective set of addresses within the memory space and the respective latency metric applies to the respective set of addresses.

Aspect 3: The method, apparatus, or non-transitory computer-readable medium of any of aspects 1 through 2, where the physical region of allocated memory associated with the memory space spans a plurality of interleaved memory modules of the memory system and the one or more memory boundaries are based on the plurality of interleaved memory modules.

Aspect 4: The method, apparatus, or non-transitory computer-readable medium of aspect 3, where at least one address boundary of the one or more address boundaries corresponds to a respective interleaved memory module of the plurality of interleaved memory modules and the respective latency metric associated with the at least one address boundary is based on the corresponding interleaved memory module.

Aspect 5: The method, apparatus, or non-transitory computer-readable medium of any of aspects 1 through 4, where transmitting the indication of the memory space and the one or more performance records includes operations, features, circuitry, logic, means, or instructions, or any combination thereof for transmitting the indication of the memory space and the one or more performance records via a memory interface bus of the memory system.

Aspect 6: The method, apparatus, or non-transitory computer-readable medium of any of aspects 1 through 5, further including operations, features, circuitry, logic, means, or instructions, or any combination thereof for disabling, at the memory system, a translation procedure associated with translating physical addresses of the physical region of allocated memory to corresponding logical addresses, where the indication of the memory space and the one or more performance records is based on the disabling.

Aspect 7: The method, apparatus, or non-transitory computer-readable medium of any of aspects 1 through 6, further including operations, features, circuitry, logic, means, or instructions, or any combination thereof for transferring, as part of a garbage collection operation, data from a first set of physical addresses to a second set of physical addresses, where both the first set of physical addresses and the second set of physical addresses are associated with a same set of latency metrics.

Figure 7:
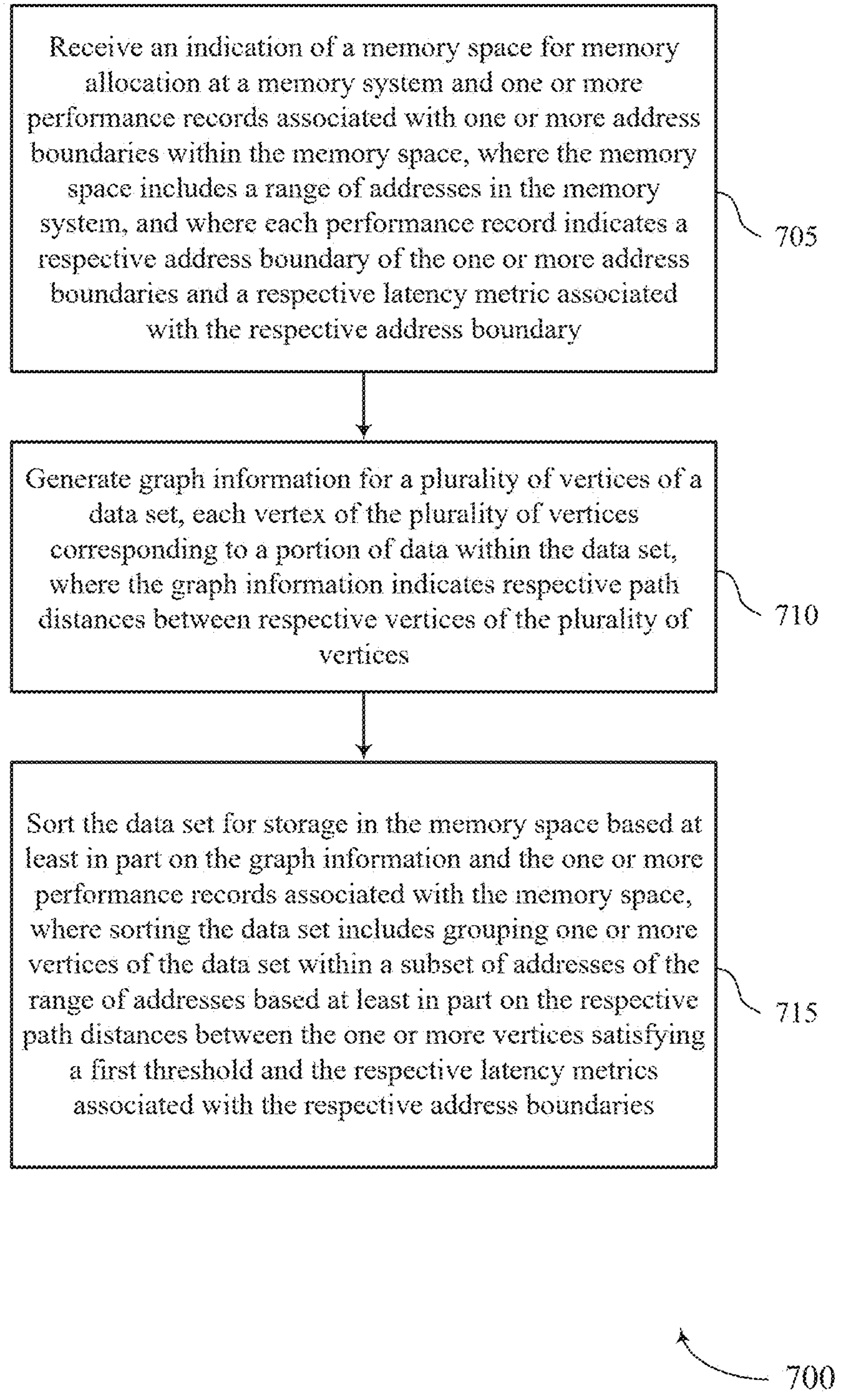

FIG. 7 shows a flowchart illustrating a method 700 that supports systems for software optimization of data layout in accordance with examples as disclosed herein. The operations of method 700 may be implemented by a host system or its components as described herein. For example, the operations of method 700 may be performed by a host system as described with reference to FIGS. 1 through 3B and 5. In some examples, a host system may execute a set of instructions to control the functional elements of the device to perform the described functions. Additionally, or alternatively, the host system may perform aspects of the described functions using special-purpose hardware.

At 705, the method may include receiving an indication of a memory space for memory allocation at a memory system (e.g., a memory system 110) and one or more performance records (e.g., performance records 230) associated with one or more address boundaries (e.g., address boundaries 205) within the memory space, where the memory space includes a range of addresses in the memory system, and where each performance record indicates a respective address boundary of the one or more address boundaries and a respective latency metric associated with the respective address boundary. In some examples, aspects of the operations of 705 may be performed by a reception component 525 as described with reference to FIG. 5.

At 710, the method may include generating graph information for a plurality of vertices (e.g., vertices 310) of a data set (e.g., a database 305), each vertex of the plurality of vertices corresponding to a portion of data within the data set, where the graph information indicates respective path distances between respective vertices of the plurality of vertices. In some examples, aspects of the operations of 710 may be performed by a graph component 530 as described with reference to FIG. 5.

At 715, the method may include sorting the data set for storage in the memory space based on the graph information and the one or more performance records associated with the memory space, where sorting the data set includes grouping one or more vertices of the data set within a subset of addresses (e.g., a memory region 315-*a*, a memory region 315-*b*, a memory region 315-*c*) of the range of addresses based on the respective path distances between the one or more vertices satisfying a first threshold and the respective latency metrics associated with the respective address boundaries. In some examples, aspects of the operations of 715 may be performed by a sorting component 535 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 8: A method, apparatus, or non-transitory computer-readable medium including operations, features, circuitry, logic, means, or instructions, or any combination thereof for receiving an indication of a memory space for memory allocation at a memory system and one or more performance records associated with one or more address boundaries within the memory space, where the memory space includes a range of addresses in the memory system, and where each performance record indicates a respective address boundary of the one or more address boundaries and a respective latency metric associated with the respective address boundary; generating graph information for a plurality of vertices of a data set, each vertex of the plurality of vertices corresponding to a portion of data within the data set, where the graph information indicates respective path distances between respective vertices of the plurality of vertices; and sorting the data set for storage in the memory space based on the graph information and the one or more performance records associated with the memory space, where sorting the data set includes grouping one or more vertices of the data set within a subset of addresses of the range of addresses based on the respective path distances between the one or more vertices satisfying a first threshold and the respective latency metrics associated with the respective address boundaries.

Aspect 9: The method, apparatus, or non-transitory computer-readable medium of aspect 8, where each performance record indicates a respective set of bits indicating a respective set of addresses within the memory space and the respective latency metric applies to the respective set of addresses.

Aspect 10: The method, apparatus, or non-transitory computer-readable medium of any of aspects 8 through 9, where receiving the indication of the memory space for memory allocation and the one or more performance records includes operations, features, circuitry, logic, means, or instructions, or any combination thereof for receiving the indication of the memory space and the one or more performance records via a memory interface bus of the memory system.

Aspect 11: The method, apparatus, or non-transitory computer-readable medium of any of aspects 8 through 10, further including operations, features, circuitry, logic, means, or instructions, or any combination thereof for determining, based on the one or more performance records associated with the one or more address boundaries, an organization of memory within the memory system, where sorting the data set is based on determining the organization of memory within the memory system.

Aspect 12: The method, apparatus, or non-transitory computer-readable medium of aspect 11, where the organization includes a row size, a block size, a bank size, a plane size, a quantity of planes, a quantity of memory die, a quantity of memory ranks, or a combination thereof.

Aspect 13: The method, apparatus, or non-transitory computer-readable medium of any of aspects 8 through 12, where generating the graph information is based on an approximate nearest neighbor search (ANNS) graph algorithm.

It should be noted that the aspects described herein describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

A switching component (e.g., a transistor) discussed herein may be a field-effect transistor (FET), and may include a source (e.g., a source terminal), a drain (e.g., a drain terminal), a channel between the source and drain, and a gate (e.g., a gate terminal). A conductivity of the channel may be controlled (e.g., modulated) by applying a voltage to the gate which, in some examples, may result in the channel becoming conductive. A switching component may be an example of an n-type FET or a p-type FET.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

The functions described herein may be implemented in hardware, software executed by a processing system (e.g., one or more processors, one or more controllers, control circuitry processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving a request for an allocation of a memory space, the memory space comprising a range of addresses in a memory system;

allocating, based on the request, a physical region of memory that comprises one or more memory boundaries; and transmitting, based on the request and on the allocation of the physical region, an indication of the memory space and one or more performance records associated with one or more address boundaries within the memory space, wherein each address boundary of the one or more address boundaries is associated with a respective latency metric based on the one or more memory boundaries, and wherein each performance record indicates a respective address boundary of the one or more address boundaries and the respective latency metric associated with the respective address boundary.

2. The method of claim 1, wherein:

each performance record indicates a respective set of bits indicating a respective set of addresses within the memory space, and the respective latency metric applies to the respective set of addresses.

3. The method of claim 1, wherein:

the physical region of allocated memory associated with the memory space spans a plurality of interleaved memory modules of the memory system, and the one or more memory boundaries are based on the plurality of interleaved memory modules.

4. The method of claim 3, wherein:

at least one address boundary of the one or more address boundaries corresponds to a respective interleaved memory module of the plurality of interleaved memory modules, and the respective latency metric associated with the at least one address boundary is based on the corresponding interleaved memory module.

5. The method of claim 1, wherein transmitting the indication of the memory space and the one or more performance records comprises:

transmitting the indication of the memory space and the one or more performance records via a memory interface bus of the memory system.

6. The method of claim 1, further comprising:

disabling, at the memory system, a translation procedure associated with translating physical addresses of the physical region of allocated memory to corresponding logical addresses, wherein the indication of the memory space and the one or more performance records is based on the disabling.

7. The method of claim 1, further comprising:

transferring, as part of a garbage collection operation, data from a first set of physical addresses to a second set of physical addresses, wherein both the first set of physical addresses and the second set of physical addresses are associated with a same set of latency metrics.

8. A method, comprising:

receiving an indication of a memory space for memory allocation at a memory system and one or more performance records associated with one or more address boundaries within the memory space, wherein the memory space comprises a range of addresses in the memory system, and wherein each performance record indicates a respective address boundary of the one or more address boundaries and a respective latency metric associated with the respective address boundary;

generating graph information for a plurality of vertices of a data set, each vertex of the plurality of vertices corresponding to a portion of data within the data set, wherein the graph information indicates respective path distances between respective vertices of the plurality of vertices; and sorting the data set for storage in the memory space based on the graph information and the one or more performance records associated with the memory space, wherein sorting the data set comprises grouping one or more vertices of the data set within a subset of addresses of the range of addresses based on the respective path distances between the one or more vertices satisfying a first threshold and the respective latency metrics associated with the respective address boundaries.

9. The method of claim 8, wherein:

each performance record indicates a respective set of bits indicating a respective set of addresses within the memory space, and the respective latency metric applies to the respective set of addresses.

10. The method of claim 8, wherein receiving the indication of the memory space for memory allocation and the one or more performance records comprises:

receiving the indication of the memory space and the one or more performance records via a memory interface bus of the memory system.

11. The method of claim 8, further comprising:

determining, based on the one or more performance records associated with the one or more address boundaries, an organization of memory within the memory system, wherein sorting the data set is based on determining the organization of memory within the memory system.

12. The method of claim 11, wherein the organization comprises a row size, a block size, a bank size, a plane size, a quantity of planes, a quantity of memory die, a quantity of memory ranks, or a combination thereof.

13. The method of claim 8, wherein generating the graph information is based on an approximate nearest neighbor search (ANNS) graph algorithm.

14. A system, comprising:
one or more memory devices; and
processing circuitry coupled with the one or more memory devices and configured to cause the system to:
receive a request for an allocation of a memory space, the memory space comprising a range of addresses in a memory system;
allocate, based on the request, a physical region of memory that comprises one or more memory boundaries; and
transmit, based on the request and on the allocation of the physical region, an indication of the memory space and one or more performance records associated with one or more address boundaries within the memory space, wherein each address boundary of the one or more address boundaries is associated with a respective latency metric based on the one or more memory boundaries, and wherein each performance record indicates a respective address boundary of the one or more address boundaries and the respective latency metric associated with the respective address boundary.

15. The system of claim 14, wherein:
each performance record indicates a respective set of bits indicating a respective set of addresses within the memory space, and
the respective latency metric applies to the respective set of addresses.

16. The system of claim 14, wherein:
the physical region of allocated memory associated with the memory space spans a plurality of interleaved memory modules of the memory system, and
the one or more memory boundaries are based on the plurality of interleaved memory modules.

17. The system of claim 16, wherein:
at least one address boundary of the one or more address boundaries corresponds to a respective interleaved memory module of the plurality of interleaved memory modules, and
the respective latency metric associated with the at least one address boundary is based on the corresponding interleaved memory module.

18. The system of claim 14, wherein, to transmit the indication of the memory space and the one or more performance records, the processing circuitry is configured to cause the memory system to:
transmit the indication of the memory space and the one or more performance records via a memory interface bus of the memory system.

19. The system of claim 14, wherein the processing circuitry is further configured to cause the memory system to:
disable, at the memory system, a translation procedure associated with translating physical addresses of the physical region of allocated memory to corresponding logical addresses, wherein the indication of the memory space and the one or more performance records is based on the disabling.

20. The system of claim 14, wherein the processing circuitry is further configured to cause the memory system to:
transfer, as part of a garbage collection operation, data from a first set of physical addresses to a second set of physical addresses, wherein both the first set of physical addresses and the second set of physical addresses are associated with a same set of latency metrics.

21. A host system, comprising:
one or more interfaces comprising one or more signal paths operable for communications with one or more memory systems; and
processing circuitry coupled with the one or more interfaces and configured to cause the host system to:
receive an indication of a memory space for memory allocation at a memory system and one or more performance records associated with one or more address boundaries within the memory space, wherein the memory space comprises a range of addresses in the memory system, and wherein each performance record indicates a respective address boundary of the one or more address boundaries and a respective latency metric associated with the respective address boundary;
generate graph information for a plurality of vertices of a data set, each vertex of the plurality of vertices corresponding to a portion of data within the data set, wherein the graph information indicates respective path distances between respective vertices of the plurality of vertices; and
sort the data set for storage in the memory space based on the graph information and the one or more performance records associated with the memory space, wherein sorting the data set comprises grouping one or more vertices of the data set within a subset of addresses of the range of addresses based on the respective path distances between the one or more vertices satisfying a first threshold and the respective latency metrics associated with the respective address boundaries.

22. The host system of claim 21, wherein:
each performance record indicates a respective set of bits indicating a respective set of addresses within the memory space, and
the respective latency metric applies to the respective set of addresses.

23. The host system of claim 21, wherein, to receive the indication of the memory space for memory allocation and the one or more performance records, the processing circuitry configured to cause the host system to:
receive the indication of the memory space and the one or more performance records via a memory interface bus of the memory system.

24. The host system of claim 21, wherein the processing circuitry is further configured to cause the host system to:
determine, based on the one or more performance records associated with the one or more address boundaries, an organization of memory within the memory system, wherein sorting the data set is based on determining the organization of memory within the memory system.

25. The host system of claim 24, wherein the organization comprises a row size, a block size, a bank size, a plane size, a quantity of planes, a quantity of memory die, a quantity of memory ranks, or a combination thereof.

26. The host system of claim 21, wherein generating the graph information is based on an approximate nearest neighbor search (ANNS) graph algorithm.

27. A non-transitory computer-readable medium storing code, the code comprising instructions executable by one or more processors to:
receive a request for an allocation of a memory space, the memory space comprising a range of addresses in a memory system;

allocate, based on the request, a physical region of memory that comprises one or more memory boundaries; and transmit, based on the request and on the allocation of the physical region, an indication of the memory space and one or more performance records associated with one or more address boundaries within the memory space, wherein each address boundary of the one or more address boundaries is associated with a respective latency metric based on the one or more memory boundaries, and wherein each performance record indicates a respective address boundary of the one or more address boundaries and the respective latency metric associated with the respective address boundary.

28. The non-transitory computer-readable medium of claim 27, wherein:

each performance record indicates a respective set of bits indicating a respective set of addresses within the memory space, and the respective latency metric applies to the respective set of addresses.

29. The non-transitory computer-readable medium of claim 27, wherein:

the physical region of allocated memory associated with the memory space spans a plurality of interleaved memory modules of the memory system, and the one or more memory boundaries are based on the plurality of interleaved memory modules.

30. The non-transitory computer-readable medium of claim 29, wherein:

at least one address boundary of the one or more address boundaries corresponds to a respective interleaved memory module of the plurality of interleaved memory modules, and the respective latency metric associated with the at least one address boundary is based on the corresponding interleaved memory module.

* * * * *